(12) United States Patent
Yu et al.

(10) Patent No.: US 11,835,621 B2
(45) Date of Patent: Dec. 5, 2023

(54) BLIND SPOT DETECTION SYSTEM WITH SPEED DETECTION FUNCTION AND DEVICE AND METHOD THEREOF

(71) Applicants: CUB ELECPARTS INC., Changhua County (TW); CUBTEK INC., Hsinchu County (TW)

(72) Inventors: San-Chuan Yu, Changhua County (TW); Hsiao-Ning Wang, Hsinchu County (TW); Ya-Ling Chi, Changhua County (TW); Chun-Jie Hsu, Hsinchu County (TW); Te-Yu Lu, Changhua County (TW)

(73) Assignees: CUB ELECPARTS INC., Changhua County (TW); CUBTEK INC., Zhubei (TW)

(*) Notice: Subject to any disclaimer, the term of this patent is extended or adjusted under 35 U.S.C. 154(b) by 402 days.

(21) Appl. No.: 17/061,424

(22) Filed: Oct. 1, 2020

(65) Prior Publication Data
US 2021/0208273 A1    Jul. 8, 2021

(30) Foreign Application Priority Data
Jan. 6, 2020   (TW) .................. 109100355

(51) Int. Cl.
*G01S 13/931* (2020.01)
*G01S 13/60* (2006.01)
*G01S 7/40* (2006.01)
*B60W 50/14* (2020.01)

(52) U.S. Cl.
CPC ........... *G01S 13/931* (2013.01); *B60W 50/14* (2013.01); *G01S 7/40* (2013.01); *G01S 13/60* (2013.01); *B60W 2050/143* (2013.01); *B60W 2300/36* (2013.01); *G01S 2013/932* (2020.01); *G01S 2013/93272* (2020.01)

(58) Field of Classification Search
CPC ..................................... G01S 13/931
See application file for complete search history.

(56) References Cited

U.S. PATENT DOCUMENTS

2001/0035049 A1* 11/2001 Balch ........................ B60L 3/10
                                                                73/488
2007/0208493 A1*  9/2007 Downs ................. G08G 1/0104
                                                                701/117

(Continued)

*Primary Examiner* — Timothy A Brainard
*Assistant Examiner* — Hailey R Le
(74) *Attorney, Agent, or Firm* — Muncy, Geissler, Olds & Lowe, P.C.

(57) ABSTRACT

A blind spot detection system with speed detection function and device and method thereof are provided. The system is disposed on the rear portion of the vehicle, and includes a signal transceiving module and a central processing unit. The central processing unit includes a speed calculation module and an object detection module. The device includes a main body in which the signal transceiving module is disposed. A first signal is sent toward a detection area behind the vehicle for acquiring a second signal for blind spot detection. By calculation based on the second signal, a third signal is acquired for identifying the static and moving objects, and the relative speed between the vehicle and the static object is determined as the speed of the vehicle. Therefore, the blind spot detection system has a speed detection function.

19 Claims, 12 Drawing Sheets

(56) References Cited

U.S. PATENT DOCUMENTS

| | | | |
|---|---|---|---|
| 2014/0266887 A1* | 9/2014 | Blase | G01S 13/42 |
| | | | 342/359 |
| 2014/0313067 A1* | 10/2014 | Hsiao | G01S 13/87 |
| | | | 342/27 |
| 2016/0320480 A1* | 11/2016 | Schwindt | G01S 13/87 |
| 2017/0176592 A1* | 6/2017 | Hoare | B60W 30/18009 |
| 2018/0032082 A1* | 2/2018 | Shalev-Shwartz | |
| | | | G01C 21/3602 |
| 2018/0194365 A1* | 7/2018 | Bae | B60W 50/14 |
| 2019/0210681 A1* | 7/2019 | Shin | B62J 6/04 |
| 2019/0337515 A1* | 11/2019 | Hyun | B60W 30/162 |
| 2020/0012281 A1* | 1/2020 | Jaegal | G05D 1/0088 |
| 2020/0156645 A1* | 5/2020 | Niioka | B60W 30/18163 |

* cited by examiner

BLIND SPOT DETECTION SYSTEM WITH SPEED DETECTION FUNCTION AND DEVICE AND METHOD THEREOF

BACKGROUND OF THE INVENTION

1. Field of the Invention

The present invention relates to blind spot detection technique, and more particularly, to a blind spot detection system with speed detection function and device and speed detection method thereof.

2. Description of the Related Art

Blind spot detection (BSD) is a safe protection mechanism commonly applied for vehicle collision prevention. The operation thereof is mainly carried out by detecting objects around the vehicle through a sensor during the moving process of the vehicle, by which a warning is generated with an approaching object (such as another vehicle) is detected. Therefore, even if the user is unable to see the approaching vehicle in the rear-view mirror, the user is still able to be aware of an approaching vehicle by use of the blind sport detection function and accordingly reacts, thereby preventing collision from happening.

However, conventional blind spot detection system applied on vehicles has certain issues.

A conventional blind spot detection system, besides the necessity of an operation power supply, will be activated only when the vehicle reaches a certain speed during the movement process. Therefore, it is necessary to acquire the speed of the vehicle on which the blind spot detection system is installed, so as to acquire an accurate blind spot detection result. However, the conventional blind spot detection system does not include a speed detection mechanism itself, so that only the relative speed with respect to the target object is acquired. Taking a car as an example, the system needs to be connected with the controller area network (CAN bus) of the central control system of the car, so as to acquire the speed signal of the car for activating the blind spot detection function. Therefore, the installation of the blind spot detection system on the car causes the issues of additional processing procedure and cost. Taking a motorcycle as an example, the conventional blind spot detection system applied on the motorcycle is not connected with the speed of the motorcycle. Thus, whether the vehicle is moving or static moves, the warning of the blind spot detection system will be continuously sent, and the possibility of a false alarm becomes higher and more frequent. If a speed detection mechanism is to be installed on the blind detection system of the motorcycle, whose speed is mainly determined by detection of the rotation laps of the tire of the motorcycle, the tire diameters of different motorcycle are not identical. If the blind spot detection system is to be activated according to detected speed, the speed detection mechanism has to be set up in accordance with different tire diameters of different models of motorcycle. Therefore, it is bothersome to capture the speed signal, so that the blind spot detection system is not commonly applied on motorcycles.

Usually, taking a car as an example, the blind spot detection system is installed on the rear bumper of the car. Therefore, during the installation process, the rear bumper of the car needs to be removed first for installing the sensor, and subsequently be put back on the end of the car. Also, the blind spot detection system needs to be connected with the controller area network of the central control system of the car, so as to capture the speed signal for activating the blind spot detection system. Obviously, the installation method of the conventional blind spot detection system on the car is complicated and difficult. Taking the radar optimization into consideration, normal user or traditional car maintenance plant have to opportunities to install the detection system.

Therefore, it is desirable to resolve the issues of application of blind spot detection systems on vehicles.

SUMMARY OF THE INVENTION

For improving the issues above, a blind spot detection system and device and speed detection method thereof are disclosed. The blind spot detection system includes the speed detection function itself, so as to capture the speed of the vehicle on which the system is disposed as the basis for activating the blind spot detection function.

For achieving the aforementioned objectives, a blind spot detection system in accordance with an embodiment of the present invention is provided, which is disposed on a rear portion of a vehicle or motorcycle for blind spot detection during movement thereof, the system comprising a signal transceiving module and a central processing unit. The signal transceiving module sends a first signal toward a detection area behind the vehicle, and acquires a second signal reflected by an object in the detection area, so as to carry out a blind spot detection through the second signal. The central processing unit is electrically connected with the signal transceiving module and receives the second signal. The central processing unit comprises a speed calculation module and an object detection module. The speed calculation module calculates the relative speed between the object in the detection area and the vehicle for identifying the static object and a moving object, and determines the speed of the vehicle based on the relative speed between the vehicle and the static object. The object detection module identifies the approaching object through the second signal to carry out the blind spot detection. The central processing unit determines the possibility of collision between the approaching object and the vehicle.

In another embodiment of the present invention, a detection device of the blind spot detection system with speed detection function is provided, comprising a signal transceiving module, a central processing unit, and a main body. The signal transceiving module sends a first signal toward a detection area behind the vehicle, and acquires a second signal reflected by an object in the detection area, so as to carry out a blind spot detection through the second signal. The central processing unit is electrically connected with the signal transceiving module and receives the second signal. The central processing unit comprises a speed calculation module and an object detection module. The speed calculation module calculates the relative speed between the object in the detection area and the vehicle for identifying the static object and a moving object, and determines the speed of the vehicle according to the relative speed between the vehicle and the static object. The signal transceiving module is disposed in the main body, and the main body is fixed on the vehicle through a fix portion, such that the first signal is sent toward the detection area behind the vehicle.

In another embodiment of the present invention, a speed detection method of a blind spot detection system with speed detection function is provided, the method comprising steps of radar detection, speed calculation, and speed determination. In the radar detection step, a radar is applied for sending a first signal toward a detection area behind the vehicle, and a second signal reflected by an object in the detection area is acquired. In the speed calculation step, based on the second signal, a relative speed of the object in the detection area with respect to the vehicle is calculated to generate a third signal. In the speed determination step, based on the third signal, static objects and moving objects in the detection area are identified from all the objects in the detection area, and the relative speed of the vehicle with respect to the static object is determined as the speed of the vehicle.

By use of the blind spot detection system and speed detection method of the present invention, the static objects and moving objects are identified based on the relative speed of objects with respect to the vehicle, such that the relative speed of the vehicle with respect to the static object is determined as the speed of the vehicle. Therefore, after the system is installed on the vehicle, the detection system is operable without the necessity of being connected with the controller area network of the central control system of the vehicle, so as to save the additional installation process and cost caused by conventional blind spot detection system on the vehicle. Also, the detection system of the present invention is applicable to motorcycles. Thus, the convenience of installation of the present invention on vehicles such as cars and motorcycles is achieved.

Further, the blind spot detection device comprises a main body having a fix portion, so as to be fixed on the vehicle. Therefore, when installed on cars, the present invention is not necessary to be installed on the rear bumper of the car, and is able to be installed on other places such as the rear windshield. Also, the transmission angle of the first signal is adjustable, further achieving the simplicity and convenience of installation on the car.

DETAILED DESCRIPTION OF THE INVENTION

Figure 1:
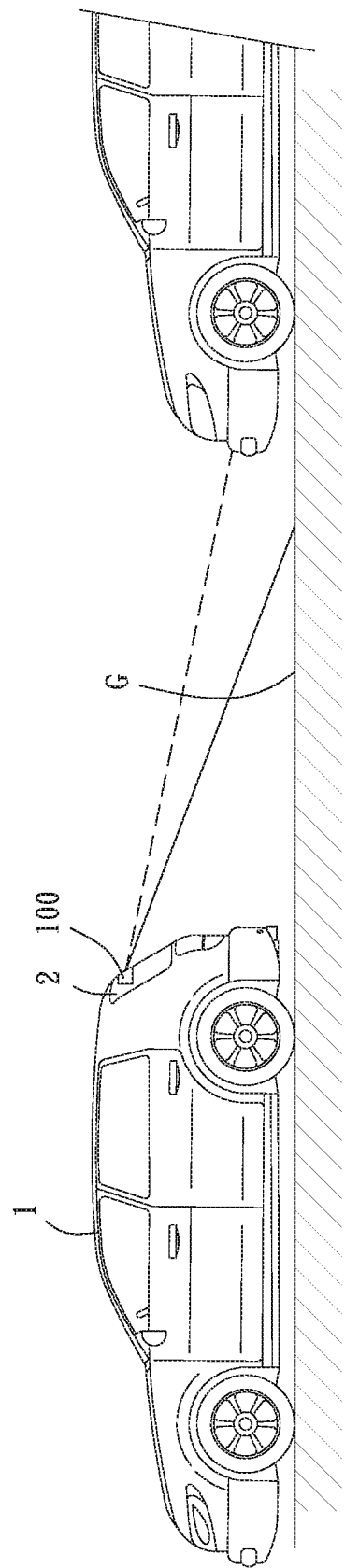
FIG. 1 is a schematic view illustrating the blind spot detection status of a moving vehicle in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 12, the present invention discloses a blind spot detection system 100 with speed detection function, a detection device 200, and a speed calculation method 300. In the first embodiment, the blind spot detection system 100 with the speed detection function comprises a signal transceiving module 10 and a central processing unit 20. The blind spot detection 100 is included in the detection device 200. Also, the detection device 200 comprises a main body 30, wherein the signal transceiving module 10 is disposed in the main body 30.

Figure 2:
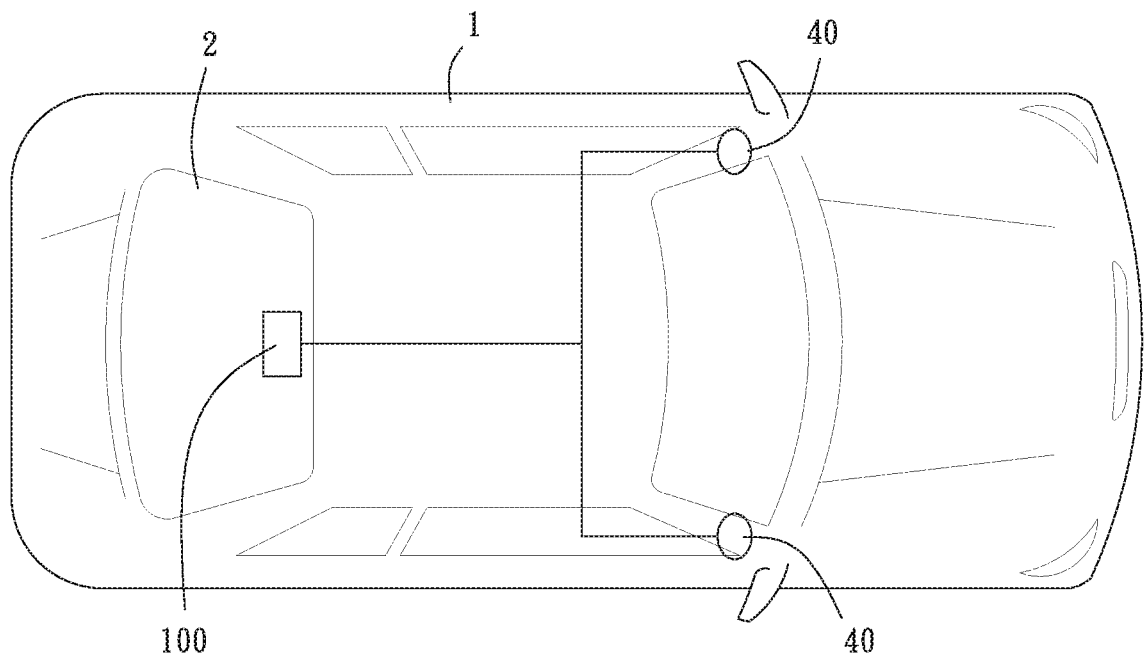
FIG. 2 is a schematic view of the blind spot detection system connected with the alarm on the vehicle.
Figure 3:
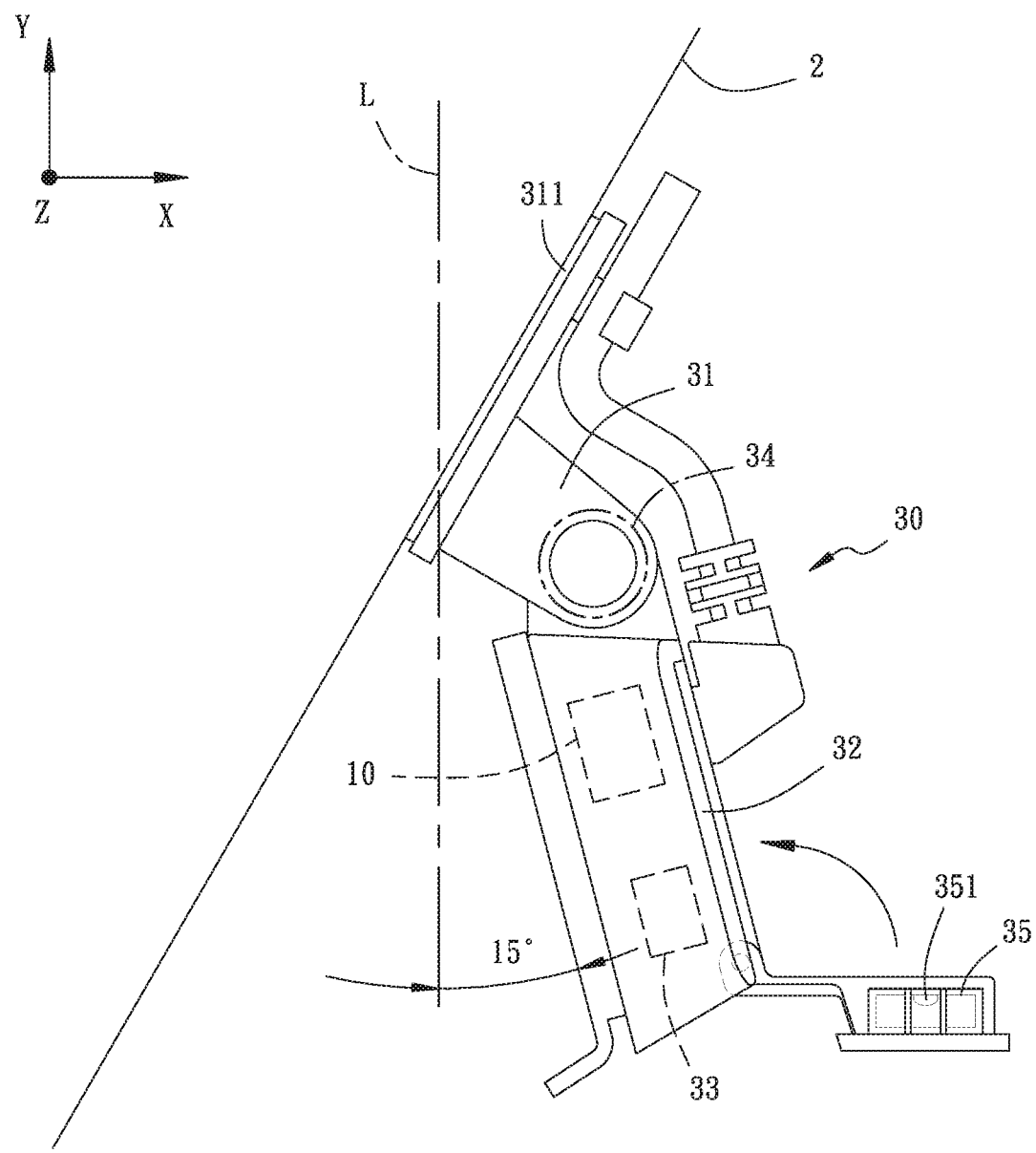
FIG. 3 is a schematic view illustrating the detection device in accordance with an embodiment of the present invention being adhered on the read windshield of the vehicle.

The vehicle, in the embodiment, is a car 1, which has a rear windshield 2 (shown by FIG. 1 and FIG. 2), and the main body 30 in the embodiment comprises a fix portion 31 and a sensing portion 32. The main body 30 is fixed on an inner side of the rear windshield 2 (as shown by FIG. 3) through the fix portion 31, and the sensing portion 32 is pivotally disposed on the fix portion 31, such that the main body 30 is disposed on the rear portion of the car 1 for carrying out the blind spot detection function during the movement of the car 1. Preferably, the fix portion 31 has a glue 311 to be fixed on the inner side of the rear windshield 2. However, the fixing method of the fix portion 31 is not limited thereto, and is also able to be attached by, for example, a sucking disc.

The signal transceiving module 10 sends out a first signal S1 toward a detection area Z behind the car 1, and acquires a second signal S2 reflected by an object in the detection area Z. The blind spot detection system 100 conducts the blind spot detection through the second signal S2. The signal transceiving module 10, in the embodiment, is disposed on the sensing portion 32 of the main body 30. The sensing portion 32 in the embodiment, is disposed on the fix portion 31 and allowed to pivot with respect to the fix portion 31. The transmission angle of the first signal S1 toward the detection area Z behind the car 1 is adjustable, wherein the angle is preferably arranged to tilt by 5 to 30 degrees from an axial direction vertical to the ground surface and face the ground surface. In the embodiment, the angle is 15 degrees.

Additionally, after the pivoting of the sensing portion 32 with respect to the fix portion 31, the sensing portion 32 is fastened to be fixed. However, random vibration of the vehicle body may cause unexpected bias error of the angle in the Z-axis rotation direction. Therefore, the main body 30 contains a gyroscope chip 33 for carrying out a horizontal calibration along the X, Y, and Z axis. Also, a dynamic stabilizer 34 (stabilizer gimbal) is disposed on a pivot junction between the fix portion 31 and the sensing portion 32, so as to provide a feedback control on the pivot motion of the sensing portion 32 with respect to the fix portion 31, thereby achieving a full-time horizontal calibration.

Accordingly, the main body 30 in the embodiment further comprises a level gauge 35, which is connected with the sensing portion 32, so as to calibrate the angle of the signal transceiving module 10 for sending the first signal S1. In other words, when the sensing portion 32 pivots with respect to the fix portion 31 to a status where a bubble 351 in the level gauge 35 stays at the middle position and remains balanced, it means that the angle of the first signal S1 is biased with respect to the axial direction L vertical to the ground surface by 15 degrees. Therefore, by use of the level gauge 35, the transmission angle of the first signal S1 is efficiently and conveniently calibrated or adjusted. In the embodiment, the level gauge 35 is pivotally disposed on the main body 30 and allowed to longitudinally pivot. When the level gauge 35 sways out of the main body 30 and is transversely place, the level gauge 35 is defined to be in the calibration status. When the level gauge 35 sways back to the main body 30 and is longitudinally place, the level gauge 35 is defined to be in the storage status. The level gauge 35 in the embodiment is not limited to be pivotally disposed on the main body 30 and allowed to be fixed to the main body 30 and permanently arranged in the calibration status.

The signal transceiving module 10 in the embodiment is an application of mmWave radar, whose frequency band for detection is 77 GHz. When the mmWave radar sends the first signal S1 at the frequency band of 77 GHz, the reflected second signal S2 is able to generate 20 to 30 reflection points in a 100-centimeter detection range, meaning that there is 1 reflection point in a 4-centimeter range. Compared with the detection frequency band of 24 GHz with only 2 reflection points in each 100-centimeter range, the present invention reaches a relatively high resolution. Also, the detection frequency band in the present invention is not limited to 77 GHz, and is allowed to be higher or lower than 77 GHz. The difference of between various detection frequency bands only lies the difference of the resolution of the reflection points. Therefore, all detection frequency bands having an acceptable resolution range of reflections are within the protection scope of the present invention.

Figure 4:
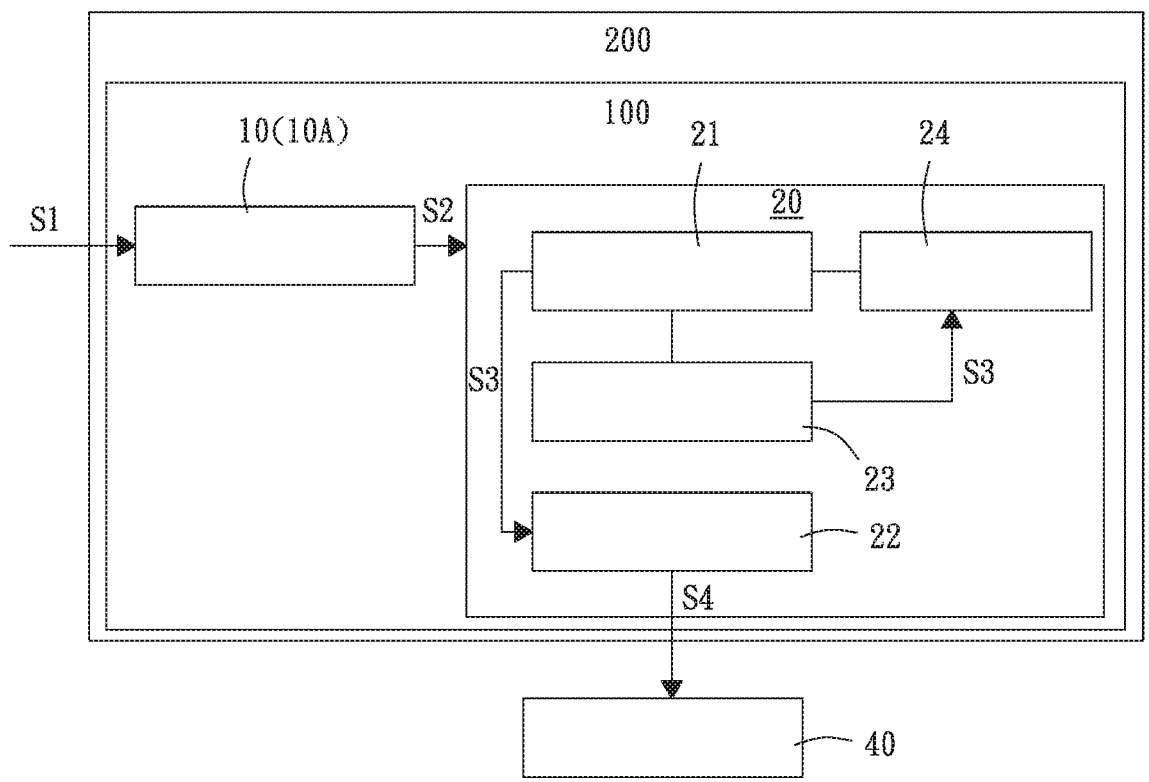
FIG. 4 is a structural block diagram of the blind spot detection system and detection device thereof.

The central processing unit 20, as shown by FIG. 4, is electrically connected with the signal transceiving module 10 for receiving the second signal S2, and the central processing unit 20 comprises a speed calculation module 21 and an object detection module 22. Also, in a preferred embodiment, the central processing unit 20 comprises a mode calculation module 23, which is electrically connected with the speed calculation module 21. Additionally, the speed calculation module 21 in the embodiment 21 comprises an average speed accumulation submodule 24. The object detection module 22, based on the received second signal S2, identifies the approaching objects in the detection area Z for carrying out the blind spot detection. Accordingly, the central processing unit 20 determines the collision probability of the approaching objects and the car 1.

When the object detection module 22 carries out the blind spot detection based on the second signal S2, the alarm 40 disposed on the car 1 will generate a warning when an object in the detection area Z approaches the car 1. The alarm 40, in the embodiment, is two warning lights disposed on the rear-view mirrors on two sides of the car 1, respectively (as shown by FIG. 2). The alarm 40 is also allowed to be a buzzer (not shown), or a combination of the aforementioned warning light and buzzer. In a case where there is no dynamic stabilizer 34 disposed on the junction between the fix portion 31 and the sensing portion for alignment compensation, any dramatic or minor variations caused by falling, tilting, moving, rotating, collision, or vibration of the main body 30 will be detected by the gyroscope chip 33, so as to activate a radar malfunction warning (such as forbidding the radar detection function, making the warning light project a long red light, or making the buzzer buzz for a long time).

Figure 5:
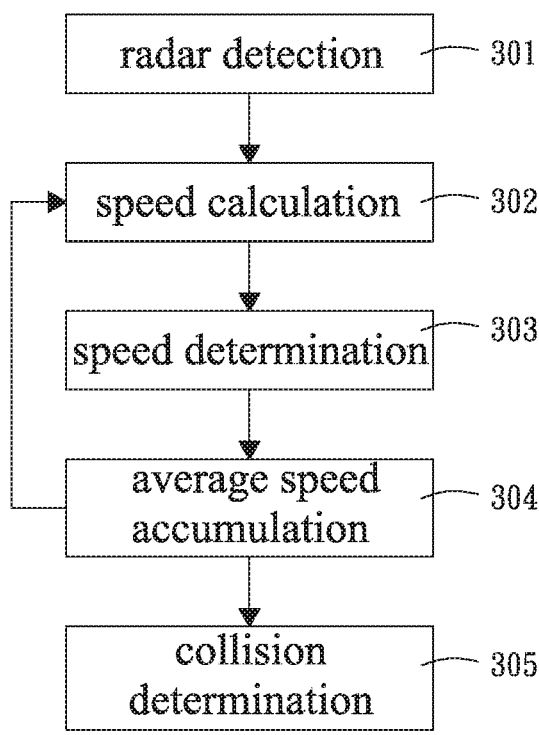
FIG. 5 is a flow chart of the speed detection method in accordance with an embodiment of the present invention.
Figure 6:
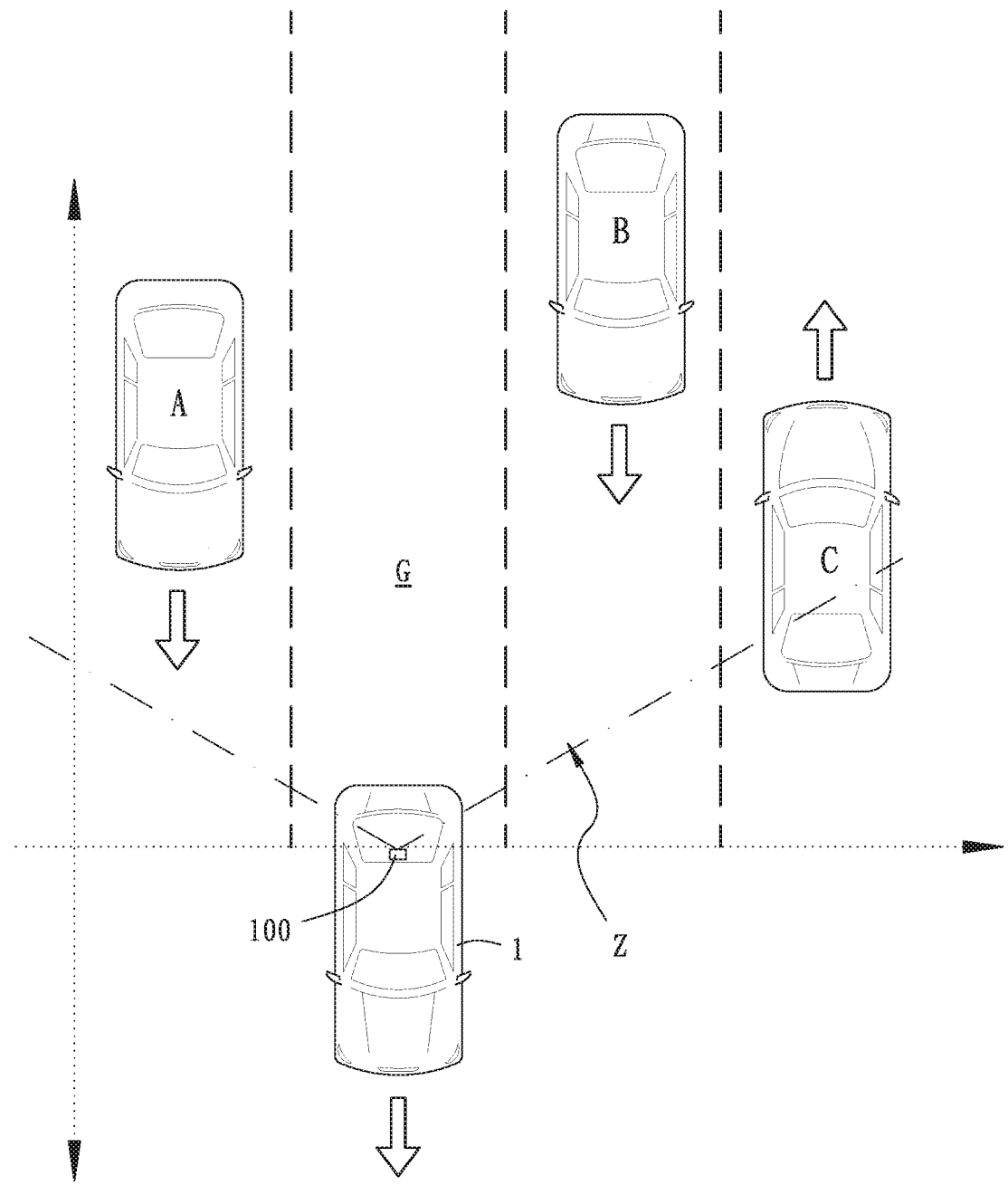
FIG. 6 is a schematic view illustrating the detection toward the detection area behind the moving car.

The description above illustrates an embodiment of the blind spot detection system 100 with speed detection function and the detection device thereof. Next, the speed detection method 300 of the blind spot detection system 100 will be illustrated, as shown by FIG. 5. The speed detection method 300 comprises a radar detection step 301, a speed calculation step 302, a vehicle speed determination step 303, and further comprises an average speed accumulation step 304 and a collision determination step 305 in the embodiment.

In the radar detection step 301, in the embodiment, a first signal S1 is sent through the signal transceiving module 10 (mmWave radar) toward a detection area Z behind the car 1, and acquires a second signal S2 reflected by the object in the detection area Z, such that the blind spot detection system 100 carries out the blind spot detection based on the second signal. For example, referring to FIG. 6, when the car 1 is moving on the road, the first signal S1 is sent by the signal transceiving module 10 toward the detection area Z behind the car 1. The detection area Z is defined as, for example, a horizontal range covering a 120-degree range right behind the car 1. Objects in the detection area Z include car A, car B, car C, and a ground surface G on which the car 1 is moving. The first signal S1 is reflected by the car A, the car B, the car C, and the ground surface G, and the second signal S2 is acquired, so that the blind spot detection system 100 is able to carry out the blind spot detection through the second signal S2.

In the speed calculation step 302, based on the second signal S2, the speed calculation module 21 in the embodiment calculates the relative speed of the object in the detection area Z with respect to the car 1, so as to generate a third signal S3, which indicates the information of the relative speed of the object in the detection area Z with respect to the vehicle. For example, if the car 1 is moving on the road at a speed of 60 km/h, the car A and car B are moving on the road at a speed of 30 km/h and 50 km/h, respectively, in the same direction with the car 1, and the car C is moving on the road at a speed of 40 km/h in an opposite direction with respect to the car 1, after calculation, the speed calculation module 21 acquires that the relative speed of the car 1 with respect to the car A is 30 km/hour, the relative speed of the car 1 with respect to the car B is 10 km/h, the relative speed of the car 1 with respect to the car C is 100 km/hour due to the opposite moving direction thereof, and the relative speed of the car 1 with respect to the ground surface G is 60 km/h. Also, in the reflection points acquired from all the objects in the detection area Z, the amount of the reflection points acquired from the ground surface G is the largest, meaning that the amount of the reflection points from the ground surface G are defined as the mode. When the amount of mode is accumulated to a certain amount, the relative speed corresponding to the mode is outputted, and such information of the relative speed is contained in the third signal S3.

Figure 7:
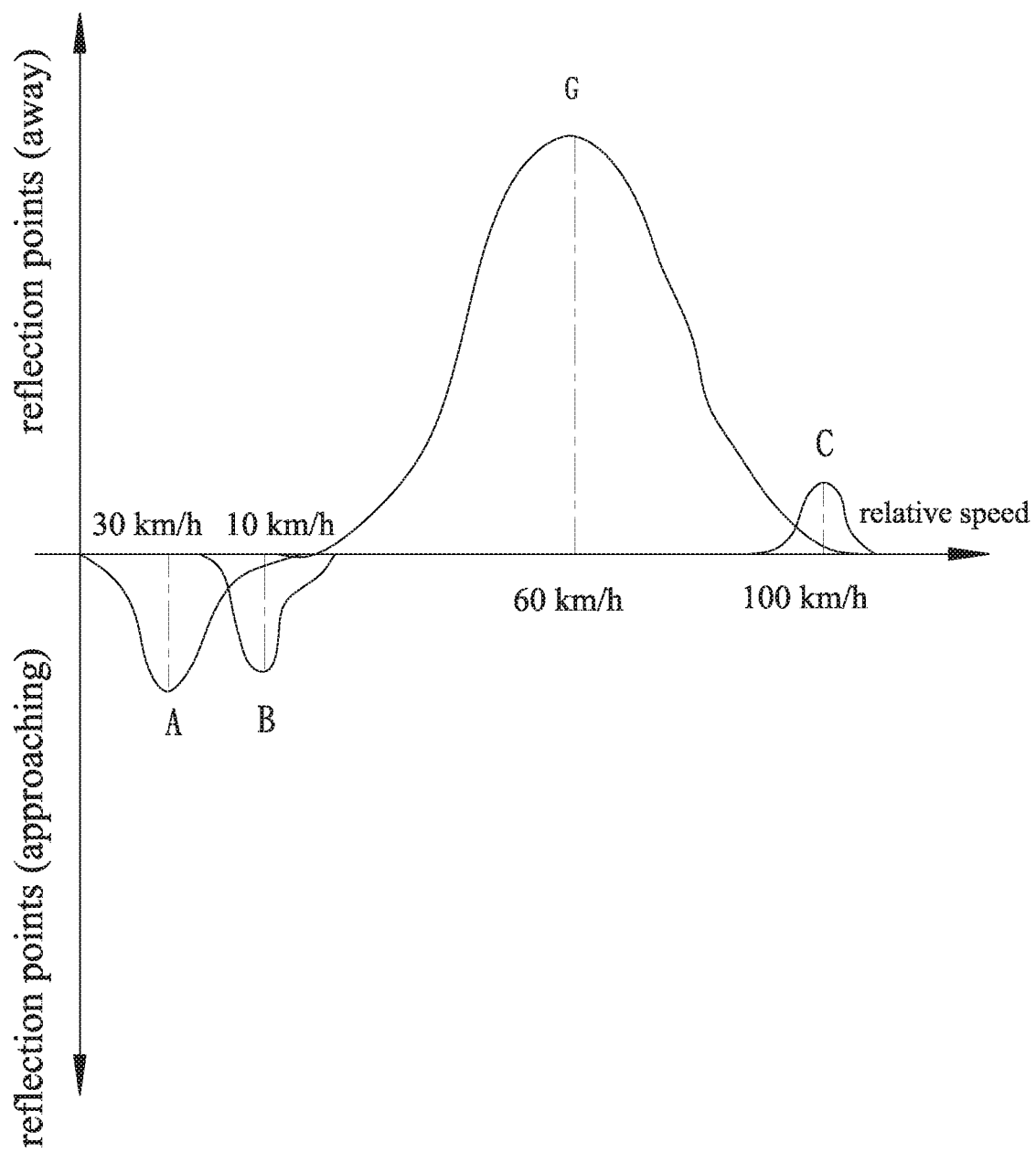
FIG. 7 is a mode distribution diagram of the relative speed and reflection points.

In the speed determination step 303, based on the third signal S3, the static objects and moving objects in the detection area Z are identified, and the relative speed of the car 1 with respect to the static objects is determined as the vehicle speed of the car 1. FIG. 7 shows the distribution of reflection points of the relative speed of the car 1 with respect to the ground surface G, the car A, the car B, and the car C acquired by the mode calculation module 23 based on the third signal S3. It is seen that the amount of the reflection points having the widest distribution area and representing the relative speed of 60 km/h is the largest one, so as to be defined as the mode. When the distribution reaches a certain amount, the mode calculation module 23 determines that the ground surface G as the static object, and the relative speed of the car 1 with respect to the ground surface G is determined as the vehicle speed (60 km/h) of the car 1.

Figure 8:
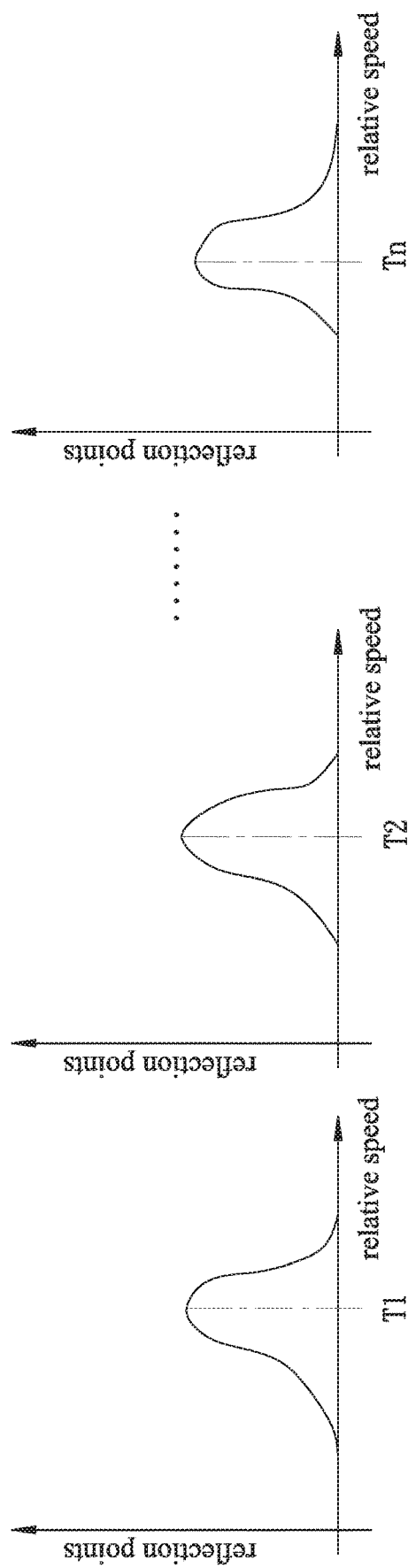
FIG. 8 is a mode distribution diagram of N sets of the relative speed and reflection points measured by the blind spot detection system along a time zone.
Figure 9:
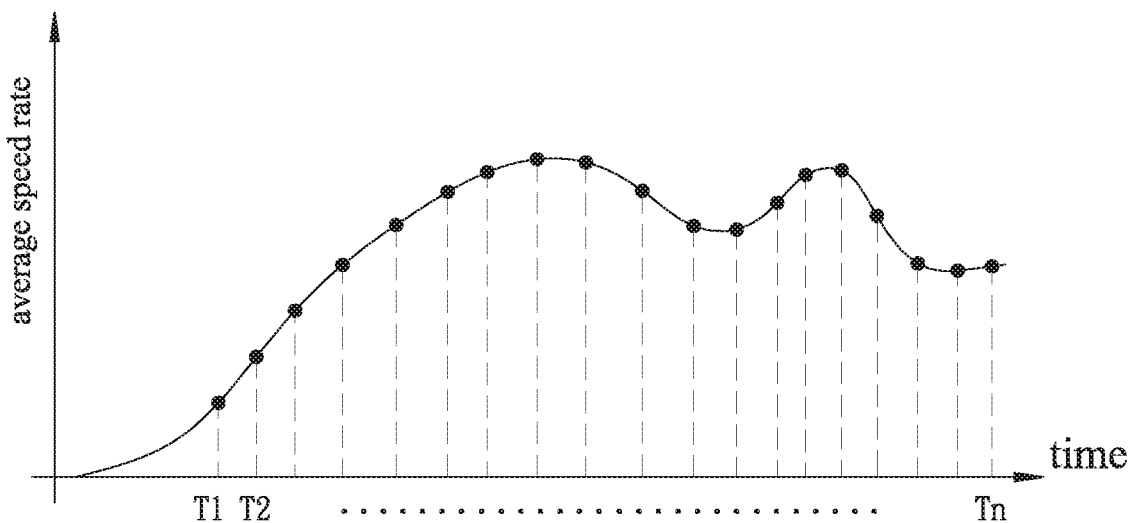
FIG. 9 is a curve diagram of the time dependent variation of the average speed based on the mode distribution diagram in FIG. 10 is an exploded view of the detection device for motorcycle in accordance with an embodiment of the present invention.

In the average speed accumulation step 304, a plurality of vehicle speeds are consecutively sampled along a time duration T, and the average speed accumulation submodule 24 continuously accumulates the plurality of sampled speeds. The aforementioned time duration T preferably ranges from 0.05 to 0.3 seconds. In the embodiment, the time duration T is 0.1 seconds. Accordingly, the mode calculation module 23 calculates the mode which has the largest amount of the relative speeds per 0.1 seconds for determining the static object, and determining the vehicle speed corresponding to the car 1 as the sampled speed. Thus, after the car 1 moving for a period of time, N sets of the sample vehicle speed (as shown by FIG. 8) are consecutively acquired per time duration T of 0.1 seconds. The average speed accumulation submodule 24 continuously accumulates the N sets of the sample vehicle speeds, so as to acquire a curve of variation of the average speed rate over the moving time of the car 1 (as shown by FIG. 9). Such curve also represents the vehicle speed variation of the car 1 in the movement.

In the average speed accumulation step 304, the average speed accumulation submodule 24 presets a speed error. If the speed difference of the sampled speeds acquired along the time duration T exceeds the speed error, the later sampled speed will not be included into the average speed accumulation. Preferably, the speed error ranges from 1 km/h to 5 km/h. In the embodiment, the speed error is preset to 5 km/h. For example, when the ground surface G is determined as the static object in a time duration T and the sampled speed is 60 km/h, and several cars fast approach from behind the car 1 and then keep moving at a speed of 60 km/h to occupy a large portion of the detection area Z, the relative speed of the car 1 with respect to the cars behind is 0 km/h. Under the identification of the mode calculation module 23, the reflections points from the approaching cars are of the largest amount and therefore determined as the static object. At the moment, the sampled speed is 0 km/h. In the time duration T of 0.1 seconds, because the speed difference between two sample speeds clearly exceeds the speed error which is preset as 5 km/h, the sampled speed of 0 km/h is excluded from the average speed accumulation step 304 and not added into the average speed accumulation for preventing erroneous determination of the vehicle speed.

In the embodiment, a collision determination step 305 is further comprised. When an object is in the detection area Z and identified as an approaching object, a warning signal S4 is generated for triggering the alarm 40 to produce warning, and the length of the warning varies from longer to shorter depending on the predicted collision time between the approaching object and the car 1. In fact, the collision time is able to be related to the operation period of the signal sending process (such as controlling PWM). Therefore, the warning signal S4 drives the warning motion of the alarm 40 to relatively strengthen from a weaker status. Taking the aforementioned warning light as the example for example, when the collision time of the approaching object becomes shorter, the strength of the warning light turns brighter from a darker status, the flashing frequency becomes faster from a slower status, and the color-light contrast or the color of lights are changed (such as green/yellow/red) for identifying the emergency level. Taking the aforementioned buzzer as an example, when the collision time of the approaching object and the car 1 becomes shorter from a longer one, the volume of the buzz becomes larger.

The blind spot detection system 100 comprises a lane change assistance (LCA) mode. In the lance change assistance mode, through the direction indicator signal on the controller area network, the helm angle signal generated by the steering wheel, and by use of the aforementioned collision determination step 305, the warning can be intensified under a high collision risk coefficient, such as using a red light or high flashing frequency of light to indicate the potential risk when the direction indicator signal is inputted.

Accordingly, the static objects in the present invention, besides the ground surface (road), also include roadside guardrails, trees and wire poles that are fixed and not movable. The moving objects in the present invention, besides cars moving on the ground surface, include motorcycles, pedestrians, or animals that are movable. The approaching object in the present invention means the moving objects which is relatively near the car 1. For example, when a car (or motorcycle) enters the detection area Z and move close toward the car 1 from behind, the car (or motor cycle) is defined as the approaching object.

The content above is a first embodiment of the blind spot detection system 100, detection device 200, and speed detection method 300 applied on the car 1. The second embodiment of the present invention is applied on a motorcycle 3, wherein the application of the blind spot detection system 100 and the speed detection method 300 are similar to the first embodiment on the car 1. The difference with the first embodiment mainly lies in that the detection device 400 is different from the detection device 200 of the car 1.

Figure 10:
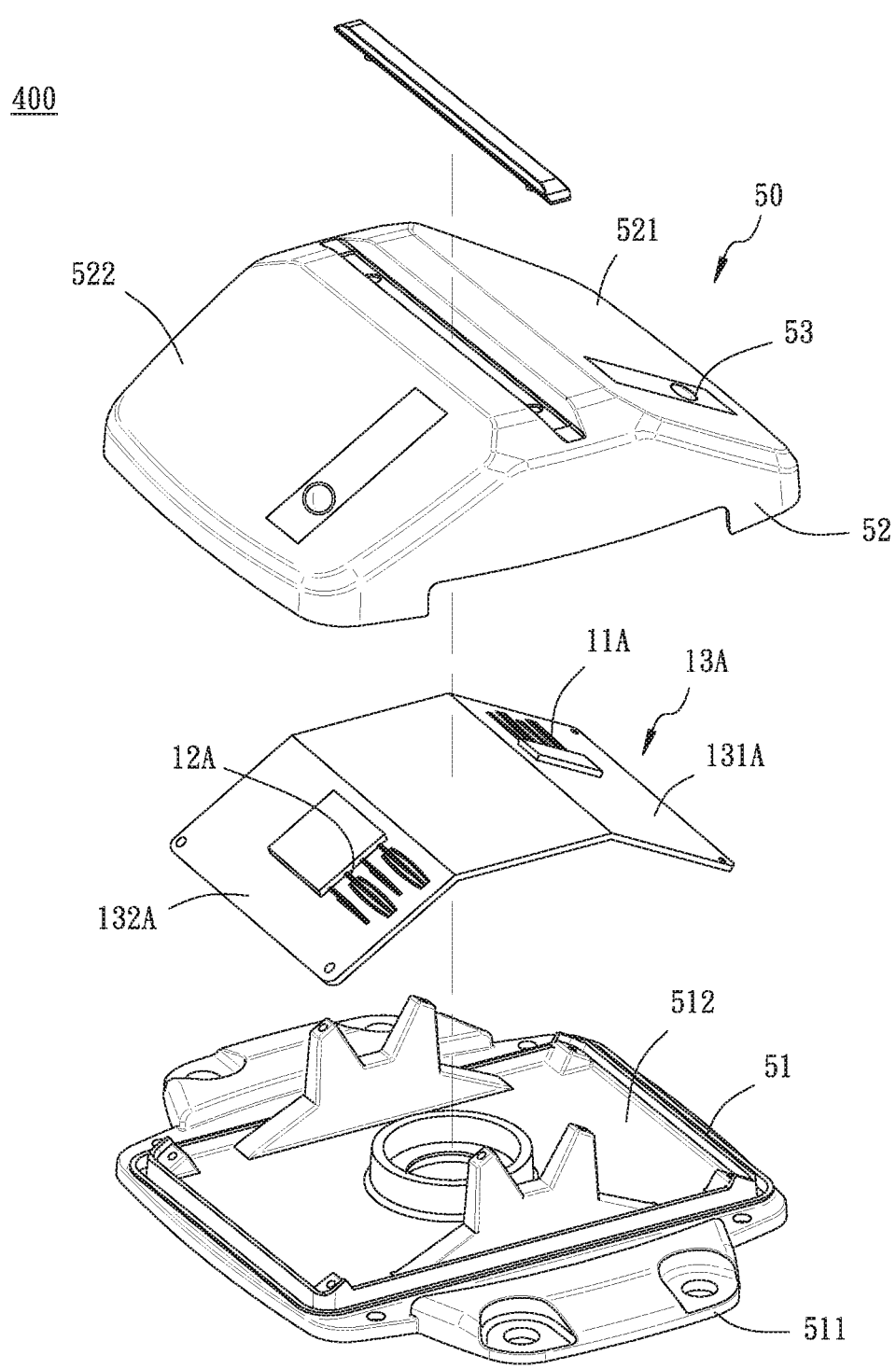
Figure 12:
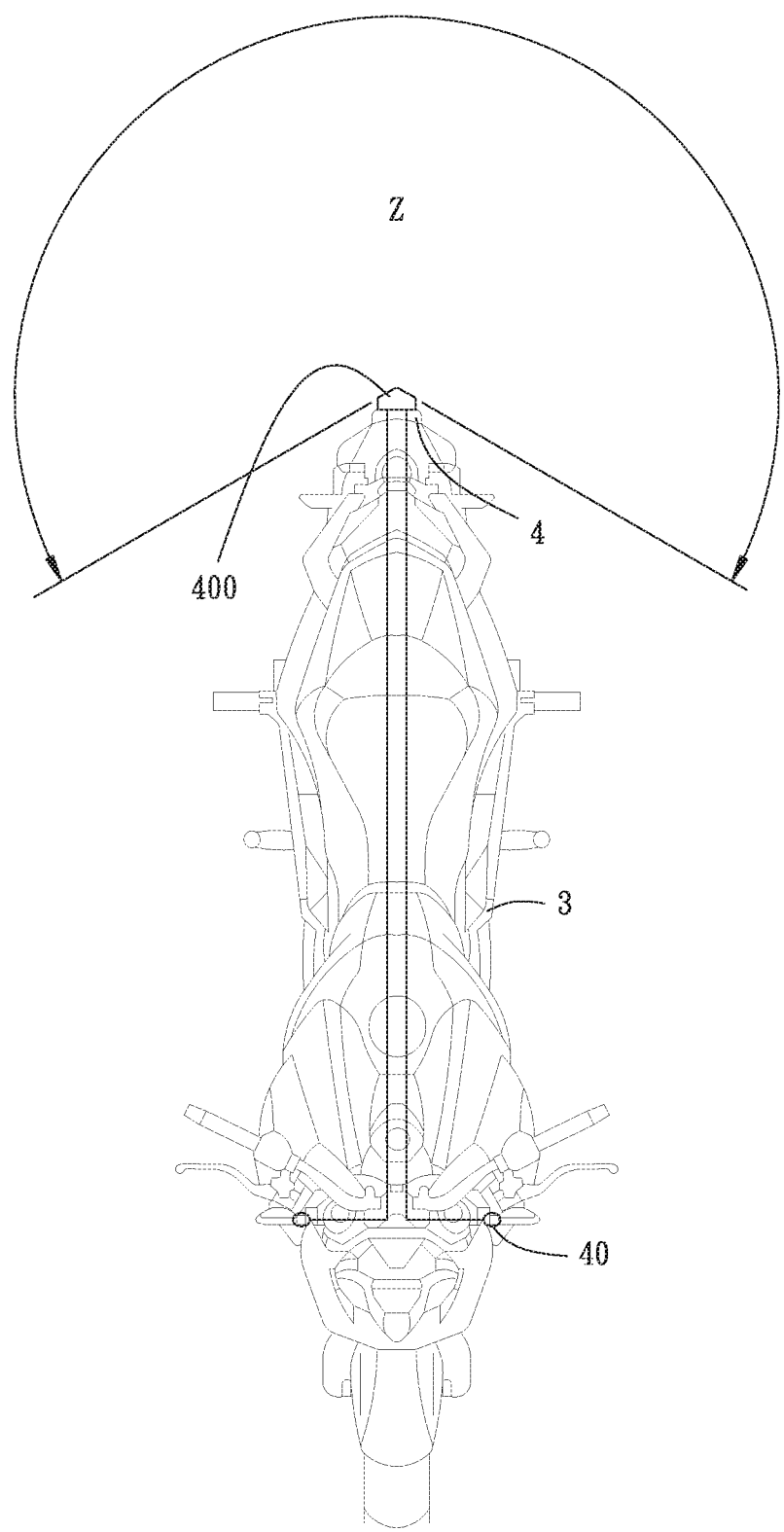
FIG. 12 is a schematic view illustrating the detection area of the blind spot detection system applied on a motorcycle.

The detection device 400 of the embodiment, as shown by FIG. 10, comprises a main body 50, which has a base 51 and an outer shell 52. The fix portion 511 is fixed on the base 51 to be fastened with a screw bolt, with the outer shell 52 covers the base 51. The main body 50 is fixed through the fix portion 511 on an installation portion 4 on the rear portion of the motorcycle 3 (as shown by FIG. 12), and the installation portion 4 is located at the position of the license plate.

The signal transceiving module 10A in the embodiment, as shown by FIG. 10, comprises a first antenna 11A, a second antenna 12A, and a circuit board 13A. The first antenna 11A and the second antenna 12A send a first signal S1, respectively. The circuit board 13A further comprises a first board portion 131A and a second board portion 132A, wherein the first antenna 11A is disposed on the first board portion 131A, and the second antenna 12A is disposed on the second board portion 132A. In the embodiment, the first board portion 131A and the second board portion 132A are disposed on the base 51 to include an angle θ. Preferably, the angle θ ranges from 80 to 130 degrees. In the embodiment, the angle is about 120 degrees. In the embodiment, the first antenna 11A and the second antenna 12A send the first signal S1, such that the detection area Z behind the motorcycle 3 reaches a 240-degree range (as shown by FIG. 12).

In the second embodiment, the first antenna 11A, the second antenna 12A, and the circuit board 13A are all disposed in the main body 50.

Figure 11:
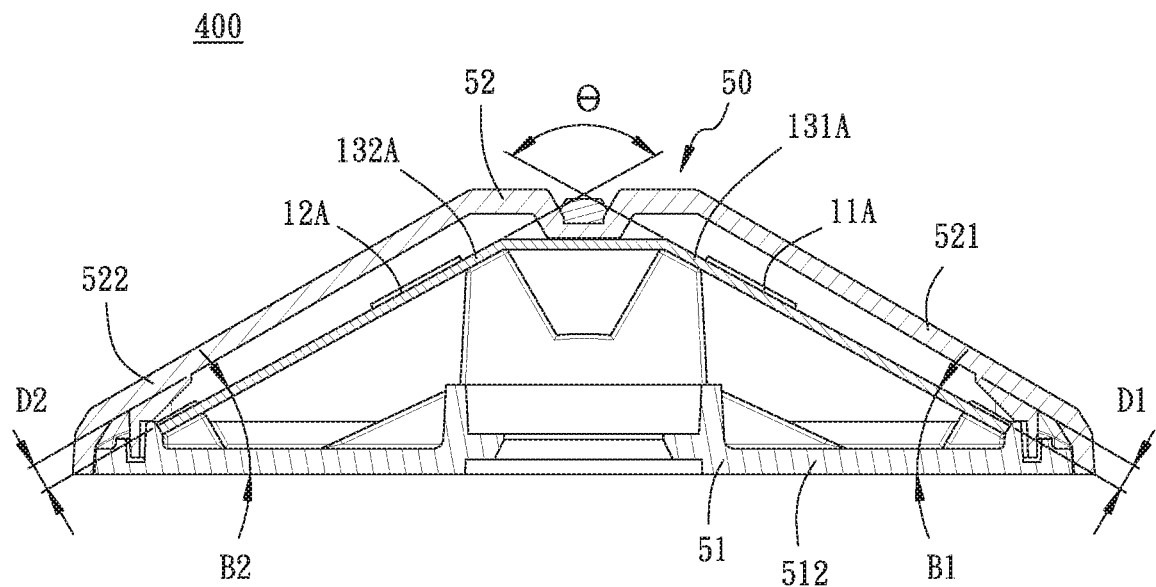
FIG. 11 is a sectional view of the detection device for motorcycle.

As shown by FIG. 11, the first board portion 131 and the outer surface 512 of the base 51 includes an angle B1, and the second board portion 132A and the outer surface 512 of the base 51 include an angle B2, wherein following conditions are fulfilled: 25 degrees≤B1≤50 degrees; 25 degrees≤B2≤50 degrees. Thus, the base 51 is allowed to be directly adhered to the installation portion 4 of the motorcycle 3, not only simplifying the installation process of the vehicle body, but also maintaining the expected detection angle and range. In the second embodiment, the angle B1 and the angle B2 are both 30 degrees.

A thickness of the detection device 400 is defined as the thickness HT and calculated from the outer surface 512 of the base 51, which fulfills following conditions: 15 mm≤HT≤50 mm. Because the vehicle body of the motorcycle is usually formed of metal material, taking the echo wave of electromagnetic wave into consideration, the detection device 400 is not suitable to be installed inside the motorcycle 3. Besides, when the detection device 400 of the embodiment is installed on the outer surface of the motorcycle 3, the detection device 400 is prevented from overexposed (such as not exposed out of the range of the rear light) for meeting relative regulations. Also, while fulfilling the condition requirements of the angle θ, angle B1, angle B2, and HT, the detection device 400 still has sufficient detection angle and range. In the first embodiment, the thickness HT is about 29.9 mm.

As shown by FIG. 11, the outer shell 52 further comprises two cover portions 521, 522 having consistent thickness quality, so that the unevenness of thickness due to inevitable manufacturing tolerance is prevented. The first board portion 131A (position of the signal transmission source of the first antenna 11A) is arranged in parallel to the cover portion 521 and has an interval D1 there between. The second board portion 132A (position of the signal transmission source of the second antenna 12A) is arranged in parallel to the cover portion 522 and has an interval D2 there between. Following conditions are fulfilled: 0 mm<D1≤5 mm; 0 mm<D2≤5 mm. Thus, the outer shell 52 is manufactured in a small scale, and able to lower the lens effect thereof for preventing focusing or dispersing the radar wave, thereby achieving a wide-angle detection function and having the anti-vibration property for noise reduction. Preferably, following conditions are fulfilled: 2 mm≤D1≤3 mm; 2 mm≤D2≤3 mm. In the embodiment, the interval D1 and interval D2 are both 2.5 mm. In the embodiment, the two cover portions 521, 522 of the outer shell 52 are disposed corresponding to the first board portion 131A and the second board portion 132A, respectively. The base 51 is disposed away from one side of the first board portion 131A and the second board portion 132A having a smaller interval therebetween.

According to other embodiment of the present invention (not shown), when the detection device 400 is to carry out a long distance detection, the surface of the two cover portions 521, 522 of the outer shell 52 adjacent and facing the first board portion 131A and the second board portion 132A are able to be designed as a curving face, so as to generate a lens effect. In other words, the cover portions 521, 522 are like an "electromagnetic lens" which can change the direction of the radar wave. The curvature of the cover portions 521, 522 is related to the dielectric constant of the material thereof. Different shapes of the cover portions 521, 522 (shapes of the electromagnetic lens as well) will generate different electric field phases. Further, when the outer surface of the cover portion 521, 522 is formed in a convex surface, when things like dust or raindrop attach to the outer surface, the attachment things are easily blown away by air along the curving outer face during the movement of the motorcycle 3, so as to maintain the electromagnetic lens property of the cover portions 521, 522. In other words, dust and raindrop will not affect and change the surface curvature or of the cover portions 521, 522 or the path length of the radar wave. Also, the surface of the cover portions 521, 522 is allowed to have photocatalyst coating (such as metal oxide having $TiO_2$ content), which, under the sun light or UV light, decomposes organic matters on the surface. Therefore, oily pollutant or bacterial on the surface will become $CO_2$ and water under sun light. Also, photocatalyst coating acquires the super-hydrophilicity property under UV light, so that water membrane enters between dust and super-hydrophilic coating and easily cleanse the dust and reduce the interference upon the transmission face caused by the dust.

Besides, by application of the blind spot detection system 100 and the speed detection method thereof 300, the blind spot detection function is still operable. With the aforementioned alarm 40 disposed on the rear view mirrors of the motorcycle 3 for providing the warning function, the blind spot detection function is achievable by use of the speed detection function of the blind spot detection system 100.

In the embodiment, the blind spot detection system 100 further comprises a collision warning light 53 (such as flashing light, signal light, and ground light), which projects light outward from the cover portions 521, 522 of the outer shell 52. Therefore, when the detection device 400 is applied for blind spot detection with the application of the collision warning light 53, in the blind spot detection and lane change assistance mode, when the collision time of the approaching object and the vehicle become shorter, the performance method of the warning light is allowed to be adjusted, such as brightening from dark light, increasing flashing frequency form slow to fast, changing color-light contrast or color of lights (such as green/yellow/red) for warning the approaching vehicles behind to slow down or avoid, achieving an active warning effect.

With the foregoing configuration, advantages of the present invention will be illustrated below.

The blind spot detection system 100 and the speed detection method 300 thereof are able to identify the static objects and moving objects based on the relative speed of the car 1 or the motorcycle 3 with respect to the objects in the detection area Z. By determining the relative speed between the vehicle and the static object as the vehicle speed, the vehicle speed information is applied for activating the blind spot detection function of the blind spot detection system 100. When the blind spot detection system 100 having the speed detection function itself is installed on the car 1, the system 100 does not have to capture the speed signal, such that the system 100 is operable without the necessity of connection with the control area network of the central control system of the car 1. Compared with conventional technique, installation of the blind spot detection system 100 does not cause additional process and cost. Also, due to the innate speed detection function, when the system is installed on a motorcycle 3, the speed information can be acquired without calculating the wheel diameter, so as to be commonly applied on motorcycles 3. Therefore, the blind spot detection system 100 fulfills the fast installation and application on cars 1 and motorcycles 3.

In addition, the blind spot detection device 200 has a main body 30 to be fixed on the car 1. Therefore, it is not necessary to be installed on the rear bumper of the car 3, and able to be installed on, for example, the real windshield 2 for adjusting the transmission angle of the first signal S1. Compared with conventional technique, the installation of the present invention is relative simple and convenient. Regarding the blind spot detection device 400 for motorcycles 3, the main body 50 thereof is fixed on the rear portion, such as the position of the license plate, of the motorcycle 3 through the fix portion 511, achieving the convenience of installation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A blind spot detection system with speed detection function, the system being disposed on a rear portion of a vehicle for carrying out a blind spot detection, the system comprising:
   a signal transceiving module, sending a first signal toward a detection area behind the vehicle, and acquiring a second signal reflected by an object in the detection area, wherein an angle of sending the first signal by the signal transceiving module is arranged to tilt by 5 to 30 degrees from an axial direction vertical to a ground surface and face the ground surface; and
   a central processing unit, electrically connected with the signal transceiving module and receiving the second signal, the central processing unit comprising a speed calculation module, an object detection module and a mode calculation module, the speed calculation module calculating a relative speed between the vehicle with respect to objects in the detection area for identifying the objects as a static object or a moving object, and determining the relative speed of the vehicle with respect to the static object as a speed of the vehicle, the object detection module identify approaching objects in the detection area based on the second signal to carry out the blind spot detection, the central processing unit accordingly determining a possibility of collision between the approaching objects and the vehicle, the mode calculation module electrically connected with the speed calculation module; the mode calculation module determines the objects which have an identical relative speed presented in a largest amount as the static objects.

2. The system of claim 1, wherein the signal transceiving module is an mmWave radar, whose detection band is 77 GHz.

3. The system of claim 1, wherein the speed calculation module comprises an average speed accumulation submodule; a plurality of vehicle speeds are sampled along a time duration when the vehicle is moving, and the sampled vehicle speeds are accumulated; the average speed accumulation submodule presets a speed error; when a speed difference between the vehicle speeds sampled along the time duration exceeds the speed error, the later sampled speed is not included into the average speed accumulation.

4. The system of claim 3, wherein the speed error ranges from 1 km/h to 5 km/h, and the time duration ranges from 0.05 seconds to 0.3 seconds.

5. A detection device of a blind spot detection system with speed detection function, the detection device comprising:
   a signal transceiving module, sending a first signal toward a detection area behind the vehicle, and acquiring a second signal reflected by an object in the detection area, wherein an angle of sending the first signal by the signal transceiving module is arranged to tilt by 5 to 30 degrees from an axial direction vertical to a ground surface and face the ground surface; and
   a central processing unit, electrically connected with the signal transceiving module and receiving the second signal, the central processing unit identifying objects in the detection area into a static object or a moving object, and determining a relative speed of the vehicle with respect to the static object as a speed of the vehicle;
   a main body in which the signal transceiving module is disposed, the main body comprising a fix portion, the main body being fixed to the vehicle through the fix portion, so as to send the first signal toward the detection area, wherein the central processing unit comprises a mode calculation module; the mode calculation module determines the objects which have an identical relative speed at most as the static objects.

6. The detection device of claim 5, wherein the vehicle is a car having a windshield, the main body being fixed on an inner side of the rear windshield through the fix portion.

7. The detection device of claim 6, wherein the main body comprises a sensing portion pivotally disposed on the fix portion; the signal transceiving module is disposed on the sensing portion, such that the sensing portion pivots with respect to the fix portion for adjusting an angle of sending the first signal by the signal transceiving module.

8. The detection device of claim 7, wherein the main body comprises a gyroscope chip for carry out a horizontal calibration along X, Y, and Z axis; a dynamic stabilizer is disposed on a pivot junction between the fix portion and the sensing portion, so as to provide a feedback control on a pivot motion of the sensing portion with respect to the fix portion, thereby achieving a full-time horizontal calibration.

9. The detection device of claim 7, wherein the main body comprises a level gauge connected with the sensing portion, so as to calibrate the angle of sending the first signal by the signal transceiving module.

10. The detection device of claim 5, wherein the vehicle is a motorcycle, and the main body is disposed on an installation portion on a rear portion of the motorcycle through the fix portion.

11. The detection device of claim 10, wherein the signal transceiving module comprises a first antenna, a second antenna, and a circuit board, so that the first antenna and the second antenna send the first signal; the circuit board comprises a first board portion and a second board portion, the first antenna is disposed on the first board portion, and the second antenna is disposed on the second board portion; the first board portion and the second board portion include an angle, and the angle ranges from 80 to 130 degrees.

12. The detection device of claim 11, wherein the main body comprises a base and an outer shell; the fix portion is disposed on the base, and the outer shell is disposed on the base; the first board portion and the second board portion are disposed on the base.

13. A speed detection method of a blind spot detection system with speed detection function, the blind spot detection system disposed on a vehicle for carrying out a blind spot detection during movement of the vehicle, the speed detection method comprising following steps:
   radar detection, a radar sending a first signal toward a detection area behind the vehicle, and a second signal being reflected by objects in the detection area, wherein an angle of sending the first signal by the signal transceiving module is arranged to tilt by 5 to 30 degrees from an axial direction vertical to a ground surface and face the ground surface;
   speed calculation, based on the second signal, a relative speed of the objects with respect to the vehicle being calculated for generating a third signal; and
   speed determination, based on the third signal, the objects in the detection area being identified into a static object or a moving object, and the relative speed of the static object with respect to the vehicle being determined as a speed of the vehicle, objects which have an identical relative speed with respect to the vehicle at most are determined as the static objects.

14. The speed detection method of claim 13, wherein in the radar detection step, a detection frequency band of the radar is 77 GHz.

15. The speed detection method of claim 13, further comprising an average speed accumulation step after the speed determination step, wherein a plurality of vehicle speeds are sampled along a time duration when the vehicle is moving, and the sampled vehicle speeds are accumulated; the average speed accumulation step presets a speed error; when a speed difference between the vehicle speeds sampled along the time duration exceeds the speed error, the later sampled speed is not included into the average speed accumulation.

16. The speed detection method of claim 15, wherein in the speed determination step, objects which have an identical relative speed presented in a largest amount are determined as the static objects; each of the sampled speed is the speed of the objects having the identical relative speed presented in the largest amount.

17. The speed detection method of claim 15, wherein the speed error ranges from 1 km/h to 5 km/h, and the time duration ranges from 0.05 seconds to 0.3 seconds.

18. The speed detection method of claim 13, further comprising a collision determination step, wherein when an object in the detection area is identified as an approaching object, a warning signal is generate for driving an alarm to send out a warning; when a length of a collision time of the approaching object becomes shorter, the warning signal drives the warning of the alarm strengthen from a weaker status.

19. A detection device of a blind spot detection system with speed detection function, the detection device being disposed on a motorcycle for carrying out a blind spot detection when the motorcycle is moving, the detection device comprising:

a signal transceiving module, sending a first signal toward a detection area behind the motorcycle, and acquiring a second signal reflected by an object in the detection area, wherein an angle of sending the first signal by the signal transceiving module is arranged to tilt by 5 to 30 degrees from an axial direction vertical to a ground surface and face the ground surface; the signal transceiving module comprising a first antenna, a second antenna, and a circuit board, so that the first antenna and the second antenna send the first signal; the circuit board comprising a first board portion and a second board portion, the first antenna being disposed on the first board portion, and the second antenna being disposed on the second board portion; the first board portion and the second board portion including an angle ranging from 80 to 130 degrees; and a central processing unit, electrically connected with the signal transceiving module and receiving the second signal, so as to identify objects in the detection area into a static object or a moving object, wherein the central processing unit comprises a mode calculation module; the mode calculation module determines the objects which have an identical relative speed at most as the static objects.

* * * * *